(12) United States Patent
Spray et al.

(10) Patent No.: US 7,472,882 B2
(45) Date of Patent: Jan. 6, 2009

(54) PINCH FAUCET

(75) Inventors: Richard Spray, St. Louis, MO (US); Rex Loyd McAffee, Olathe, KS (US)

(73) Assignee: Anheuser-Busch, Inc., St. Louis, MO (US)

( * ) Notice: Subject to any disclaimer, the term of this patent is extended or adjusted under 35 U.S.C. 154(b) by 0 days.

(21) Appl. No.: 11/670,744

(22) Filed: Feb. 2, 2007

(65) Prior Publication Data
US 2007/0125801 A1    Jun. 7, 2007

Related U.S. Application Data

(63) Continuation of application No. 10/953,704, filed on Sep. 29, 2004, now Pat. No. 7,178,699.

(60) Provisional application No. 60/508,158, filed on Oct. 2, 2003.

(51) Int. Cl.
B65D 37/00 (2006.01)
F16K 7/04 (2006.01)
F16L 33/00 (2006.01)

(52) U.S. Cl. .................. 251/7; 222/214; 137/614.11; 285/242

(58) Field of Classification Search .............. 251/4, 251/5, 7, 9, 231, 214, 251, 252; 222/212–214; 285/242; 137/614.11
See application file for complete search history.

(56) References Cited

U.S. PATENT DOCUMENTS 554,894 A    2/1896    Porter
579,354 A    3/1897    Wassertrom
871,073 A    11/1907   Spikes
928,813 A    7/1909    Spikes (Continued)

FOREIGN PATENT DOCUMENTS

BE    888098 A1    7/1981

(Continued)

OTHER PUBLICATIONS www.stainlessone.com, Stainless One Dispensing Systems, Internet information about product disclosed in U.S. Pat. 5,794,823 (Jul. 22, 2003).

(Continued)

*Primary Examiner*—Kevin P Shaver
*Assistant Examiner*—Melvin A Cartagena
(74) *Attorney, Agent, or Firm*—Storm LLP; Paul V. Storm; John J. Patti

(57) ABSTRACT

The present invention provides a faucet for tapping a liquid stored under pressure of a gas in a container that has less moving parts subject to wear or breakage, and has a housing made of multiple parts which can be disassembled so the faucet mechanism can be easily cleaned, repaired, or replaced. The faucet mechanism contains a piece of flexible tubing and an arrangement of a pinch roller valve mechanism that compresses the flexible tubing to shut off flow of liquid through the tubing. In one arrangement of the present invention, since the housing does not move and does not come in contact with the beverage being poured, the housing is made of a non-metallic material, such as a plastic or petroleum-based material, which is less expensive than the previous brass or stainless steel housing.

8 Claims, 4 Drawing Sheets

U.S. PATENT DOCUMENTS

| | | | |
|---|---|---|---|
| 961,739 A | 6/1910 | Stock | |
| 2,841,357 A | 7/1958 | Little | |
| 2,987,292 A * | 6/1961 | Teson et al. | 251/6 |
| 3,035,603 A | 5/1962 | Jamieson et al. | |
| 3,086,797 A * | 4/1963 | Webb | 285/242 |
| 3,197,173 A * | 7/1965 | Taubenheim | 251/6 |
| 3,550,861 A | 12/1970 | Teson | |
| 3,608,790 A | 9/1971 | Johnston | |
| 3,685,538 A | 8/1972 | Sullivan | |
| 3,718,233 A | 2/1973 | Nordhoff | |
| 3,720,355 A | 3/1973 | Johnston | |
| 3,908,871 A | 9/1975 | Gottwald | |
| 4,134,522 A | 1/1979 | Patzke et al. | |
| 4,226,343 A | 10/1980 | Fling | |
| 4,356,574 A | 11/1982 | Johnson | |
| 4,360,007 A * | 11/1982 | Levy et al. | 128/899 |
| 4,403,764 A | 9/1983 | Repplinger | |
| 4,720,076 A | 1/1988 | Hyde | |
| 4,742,942 A | 5/1988 | Dokos et al. | |
| 5,098,060 A * | 3/1992 | Mogler et al. | 251/7 |
| 5,118,015 A | 6/1992 | Scholle et al. | |
| 5,454,406 A | 10/1995 | Rejret et al. | |
| 5,573,145 A | 11/1996 | Groh | |
| 5,636,656 A | 6/1997 | Hubbard | |
| 5,730,323 A | 3/1998 | Osborne | |
| 5,750,905 A | 5/1998 | Weimer et al. | |
| 5,794,823 A | 8/1998 | Roundtree | |
| 5,938,078 A | 8/1999 | Dorsey et al. | |
| 6,019,257 A | 2/2000 | Rasmussen | |
| 6,398,084 B2 | 6/2002 | Maruyama et al. | |
| 6,457,614 B1 | 10/2002 | Amidzich | |
| 2002/0074348 A1 | 6/2002 | Heyes | |
| 2003/0111629 A1 | 6/2003 | Amidzich | |

FOREIGN PATENT DOCUMENTS

| | | |
|---|---|---|
| FR | 2698859 A | 6/1994 |
| FR | 2778959 A | 11/1999 |
| JP | 59106767 A | 6/1984 |
| WO | 8102770 A1 | 10/1981 |

OTHER PUBLICATIONS www.ventmatic.com/products/beerfaucet.html, Vent-Matic—Beer Faucet, Internet information about product disclosed in U.S. Pat. 6,457,614 (Jul. 22, 2003).

EPO Search Report dated Jun. 5, 2008.

* cited by examiner

PINCH FAUCET

CLAIM OF PRIORITY

This application is a continuation of U.S. patent application Ser. No. 10/953,704, which claims the benefit of U.S. Provisional Patent Application No. 60/508,158 entitled "PINCH FAUCET" filed on behalf of Richard Spray and Rex McAffee on Oct. 2, 2003. Each application is hereby incorporated by reference for all purposes.

TECHNICAL FIELD

The invention relates generally to dispensing of beverages and, more specifically, to a device for dispensing beverages stored under pressure in a container. The device is capable of pouring out beverages from a location remote from the container. The device works by operating a pinch lever valve on the dispensing faucet to open or close the flow of beverage through the faucet.

BACKGROUND

In many commercial establishments such as restaurants and bars, beverages, such as beer or soda, are stored under pressure in a sealed container, often in a location remote from the point where the beverages are dispensed. The container can be kept in a refrigerated compartment, so the beverages in the containers are kept cool. This enables establishments to dispense cold, fresh beverages by the glass without the need to keep a stock of filled beverage containers, like bottles and cans, at the point of dispensing. Owing to various constraints, it is often more practical or feasible for the refrigerated compartment to be kept at a location geographically remote from the point where the beverages are dispensed. In addition to taste improvement over beverages in containers and convenience, such establishments also attain a reduction in cost over serving beverages packaged in individual containers.

Typically, the sealed container, such as a keg, is attached to a faucet at the dispensing point by means of a flexible tube. Because the beverage in the container is stored under pressure, when the faucet is opened, the beverage flows from the container through the tube and out the open faucet. When the faucet is closed, the flow of beverage out the faucet ceases.

Over time and with use, the moving parts of the faucet will wear, and the faucet will cease to function efficiently, often resulting in beverage continually leaking or dripping from the faucet, even when it is shut off. The faucet housings are typically cast from a single piece of metal, because metal is resistant to wear, and many metals resist absorbing particulate matter that can yield an unpleasant taste as they breakdown, which can be transferred to beverages that are subsequently poured through the faucet. However, once the parts do ultimately wear, it can be difficult to gain access to the moving parts inside the cast unitary housing to replace or repair parts that have become worn or broken.

Additionally, the faucet can become dirty with particles from the beverage being processed remaining in the tubing and parts of the faucet. This can interfere with the system flow because of blockage. Also, because most beverages poured through such faucets have a high sugar content, and often contain yeast as well, the particulate matter remaining behind can ferment or spoil, which can affect the taste of subsequent beverages being transferred through the tube and faucet.

Often, it is difficult to clean the systems thoroughly, owing to their unitary construction. Additionally, the tubing is typically narrow to keep volume flow regulated, which can make it difficult to insert any cleaning device into the tubing. This is complicated in systems in which tubing of a flexible nature is used. Flexible tubing, which is fairly inexpensive, can usually be replaced periodically to avoid problems, if the construction of the specific system allows for such replacement. The faucets, while often of a larger in side diameter than the tubing, have attached moving parts, and typically have various curves or angles inside the housing, making it difficult to get the entire faucet thoroughly clean. Also, because the faucets are typically made of cast metals, they are expensive enough that it is difficult to cost-justify disposing of them and replacing them when parts become worn or broken or when the faucet cannot be cleaned thoroughly.

Therefore, what is needed is a faucet mechanism that is easier to clean, has fewer moving parts subject to wear or breakage, and is of a lower cost, so that if it cannot be cleaned or repaired in particular usages, the mechanism or portions thereof can be easily and inexpensively replaced.

SUMMARY

The present invention provides a faucet which is less complex than previous faucets, typically has less moving parts subject to wear or breakage, and has a housing made of multiple parts which can be disassembled so the mechanism can be easily disassembled.

In one preferred arrangement of the present invention, the housing is made of a non-metallic material, such as a plastic or petroleum-based material, which is less expensive than the previous brass or stainless steel housing, and can be more easily imprinted with words, pictures or other information. Since the housing does not move, it is subject to less wear, and can be made of a less expensive material without increasing the frequency of replacement of the device. However, the housing can also be made of metallic or other non-metallic materials. Because the housing is made of multiple pieces, it can be disassembled when necessary to clean the interior of the device or replace or repair worn or damaged parts. Alternatively, the entire faucet, or the moving parts of the faucet, can be easily replaced as a unit with new parts, and the old parts can be removed and repaired at a remote location and then used as spare parts for the same or another faucet at a later time.

In some arrangements of the present invention, some parts can be made of metals, such as stainless steel or brass, or other wear-resistant materials. Although stainless steel is more expensive than brass, parts subject to more frequent wear, such as the shank adaptor, will need to be replaced less frequently when the part is made of stainless steel or other wear-resistant materials. When the use of stainless steel or other wear-resistant materials for making parts subject to wear is combined with making non-wearing parts made of less expensive materials, the overall cost of the faucet typically is not increased, and can even be reduced. A faucet made in accordance with the present invention will have a longer life than prior art faucets.

An unexpected side benefit of the present invention has been a reduction in the amount of foam seen in beers dispensed through the faucet of the present invention. In prior art faucets, when beer flowing through the tubing reached the faucet, the flow passageway in the faucet was typically of a larger diameter than that of the tubing so that beer could be dispensed rapidly, and there was room for the shutoff and control mechanism inside the faucet. When the beer flowing through the tubing reached the area at the faucet where there was suddenly an increase in available volume, the pressure on the beer from the carbon dioxide was reduced, and the carbon dioxide would dissolve out of the solution of the beer and cause foaming of the beverage being dispensed. A high volume of foam in the dispensed beverage is undesirable, and results in wasting of the beverage being dispensed. In the faucet of the present invention, the flow passageway in the faucet is of approximately the same size as the tubing to the faucet. Thus, when beer flows through the faucet, there is no increase in volume or consequent reduction in pressure, and as a result, no excessive foaming of the beverage being dispensed.

The invention, a faucet for pouring a liquid stored under pressure of a gas in a container, comprises an outer housing made from two or more pieces capable of being secured together, a length of tubing circumscribing an opening and having an inner and outer diameter being positioned inside the housing, the tubing secured at one end to a shank adaptor that extends through an opening in the housing and extending at a second end into a second opening in the housing, and an arm external to the housing attached to a pinching device inside the housing by securing means extending through the housing. When the handle is placed in a closed position, the arm maintains sufficient pressure on the pinching device to compress the outer diameter of the tubing so as to prevent the flow of liquid through the inner diameter of the tubing, and when the handle is placed in an open position the arm relieves the pressure on the pinching device, removing compression on the outer diameter of the tubing so as to allow liquid from the container to flow through from the shank adaptor through the inner diameter of the tubing and out the second end of the tubing.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1A:
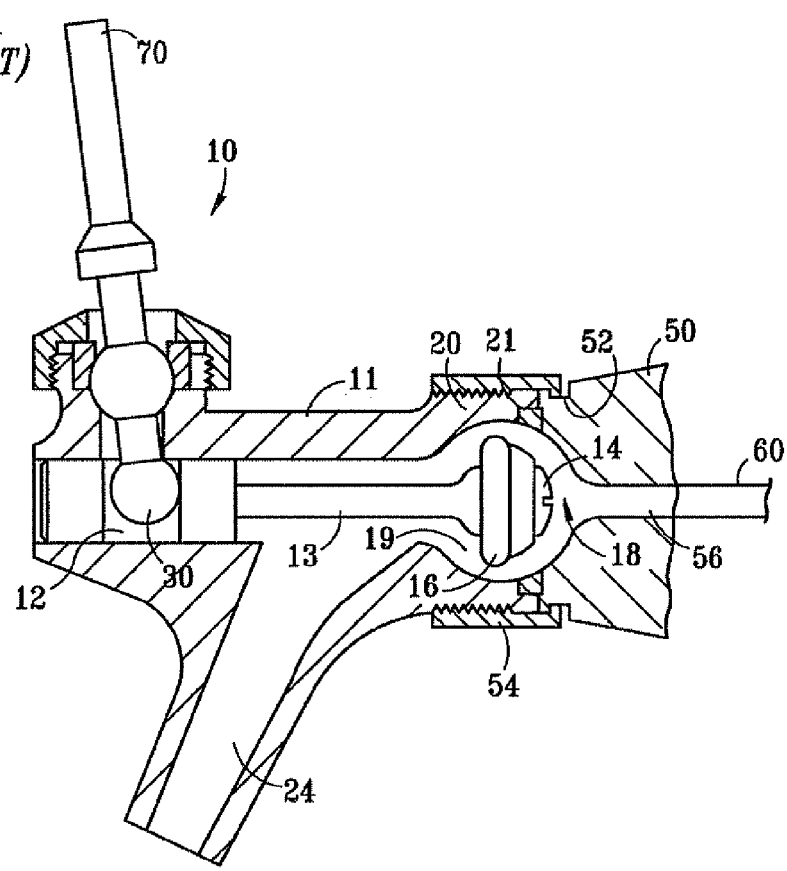
FIG. 1A is a cut-away side view of a typical prior art faucet in an open position.
Figure 1B:
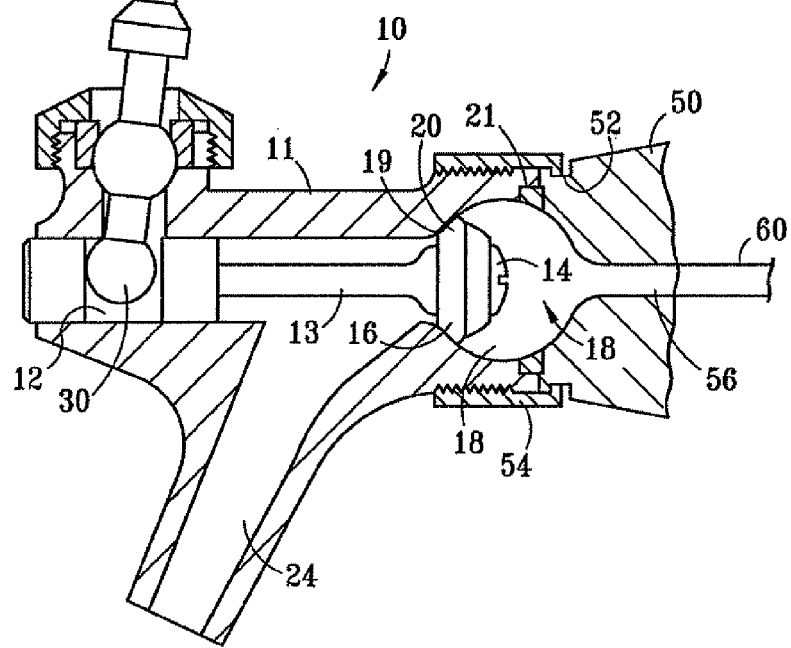
FIG. 1B is a cut-away side view of a typical prior art faucet in a closed position.

Referring to FIGS. 1A and 1B of the drawings, a typical prior art faucet assembly 10 is shown. The faucet assembly 10 is attached to a column 50 that is mounted in a wall or on top of a counter. The column 50 typically contains a shank 52. The end of the shank 52 that protrudes from the column 50 has a receptacle 54 attached thereto. The inside circumference of the receptacle 54 is threaded. The shank 52 typically contains a flow passageway 56. The flow passageway 56 is connected to one end of a length of flexible tubing 60. The other end of the flexible tubing 60 is attached to a beverage container (not shown) that can be in the same general location as the column 50, or can be at a location remote from the column 50.

The prior art faucet assembly 10 has a shank adaptor 20 at one end that is threaded on the outside. The shank adapter 20 is threaded to the receptacle 54 on the end of the shank 52. A special sealing washer 21 is typically contained inside the shank adapter 20 so that a leak-proof seal is obtained when the shank adapter 20 is attached to the receptacle 54, and beverage under pressure flows through the system. The prior art faucet assembly typically has an arm mechanism 30 seated at one end of a valve 12, located inside a housing 11, the valve 12 having a movable valve stem 13, which has a head 14 on the end of the valve stem 13 opposite the end connected to the arm mechanism 30. Typically, a gasket 16 is attached to the head 14 at the end of the valve stem 13. The head 14 resides in an opening 18 in the rear of the faucet assembly 10. The opening 18 inside the rear end of the faucet assembly 10 opens from the flow passageway 56 in the shank, and is tapered at the portion that is closest to the flow passageway 56.

When the faucet assembly 10 is in an open condition, as shown in FIG. 1A, the handle 70 is pulled forward, away from the column 50. An arm mechanism 30, which is inside the housing 11, is attached to one end of the handle 70. When the handle 70 is pulled forward, the valve 12 and attached valve stem 13 are pushed in the opposite direction. When the valve stem 13 is moved toward the column 50, the head 14 and gasket 16 on the end of the valve stem 13 is moved away from the tapered portion of the opening 18, which is known as the valve seat 19, breaking the seal formed between the gasket 16 and valve seat 19, allowing beverage to flow through the flow passageway 56, into the opening 18 and out through the nozzle 24.

When the faucet assembly 10 is in a closed condition, as shown in FIG. 1B, the handle 70 is pushed to the rear towards the column 50. The arm mechanism 30 is moved forward away from the column 50. This pulls the head 14 and gasket 16 forward into the valve seat 19. This creates a seal between the gasket 16 and the valve seat 19, preventing beverage from flowing out through the nozzle 20 in the faucet assembly 10. The gasket 16 is kept in a sealed position against the valve seat 19 by means of the head 14 and pressure from the pressurized beverage container (not shown) to which the faucet assembly 10 is attached. In other configurations of the prior art, which are not illustrated herein, the faucet assembly operates as described, but the valve seat 19 is at the rear of the opening 18, and the head 14 is pushed into the valve seat 19 to create a seal with the gasket 16. When the head 14 is pulled forward out of the valve seat 19 into the opening 18, beverage will flow out through the nozzle 20. In other arrangements of the prior art, also not illustrated here, the valve 12 is oriented vertically in the faucet assembly 10, and the head 14 sits in the valve seat 19 at the bottom of the opening 18 when the faucet 10 is closed. When the arm mechanism 30 is pulled forward, the valve 12 is lifted upward, so the head 14 and attached seal 16 rise up out of the valve seat 19 so that beverage can flow out through the nozzle 20.

The prior art faucet has many moving parts, increasing the possibility of breakage. Additionally, the moving parts are subject to wear, especially the gasket 16, head 14, and the valve seat 19. When parts wear occurs, leakage of beverage occurs, even when the faucet 10 is in the closed position. In order to replace worn gaskets 16 or heads 14, the valve 12 has to be disconnected and removed from the faucet assembly 10.

When the valve seat 19 wears away, the surface has to be reground, which also requires removing the valve 12 from the faucet 10 so that equipment to grind the surface of the valve seat 19 can be inserted in the faucet 10. These repairs are costly, and often difficult to make, given the relatively small size of the faucet assembly 10 and its unitary construction.

The present invention, alternatively, has a housing made of multiple parts secured together by securing means that can be disassembled for easy access to internal parts. Additionally, there are fewer moving parts subject to wear or breakage in the faucet of the present invention. The faucet assembly of the present invention functions with a pinch mechanism to control the flow of beverage through the faucet, rather than using a valve seat mechanism as in the prior art.

Figure 2A:
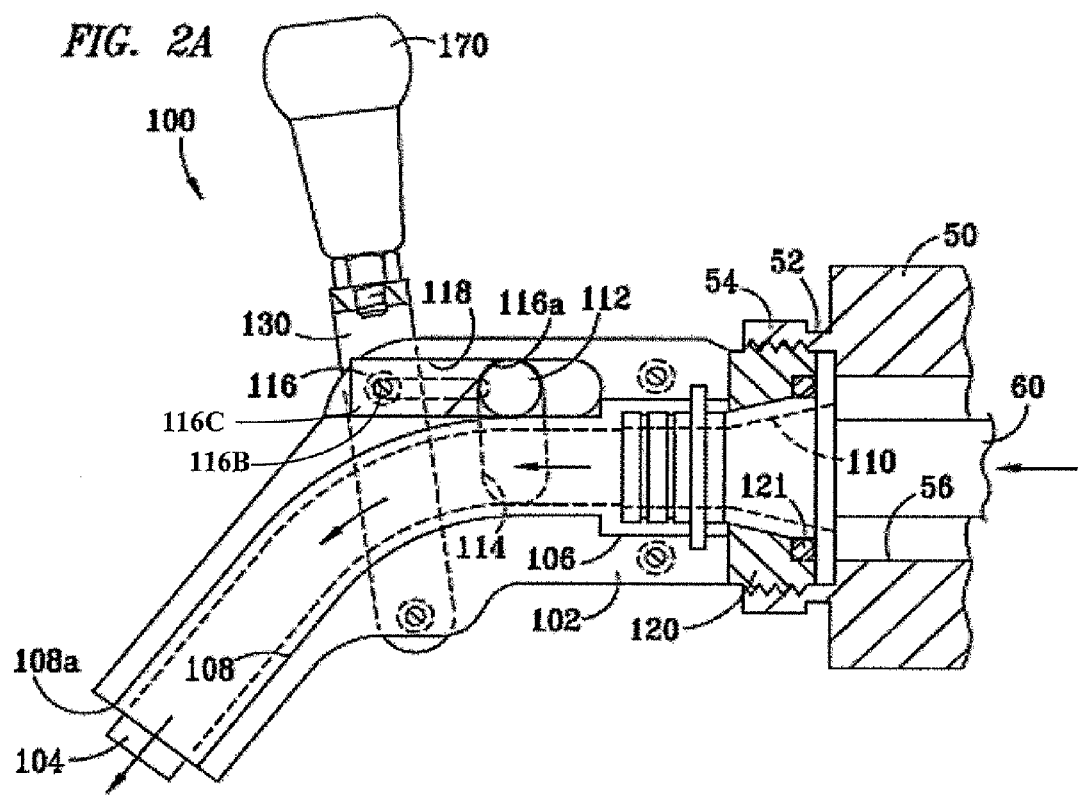
FIG. 2A is a cut-away side view of a first embodiment of a faucet according to the present invention shown in an open position.
Figure 2B:
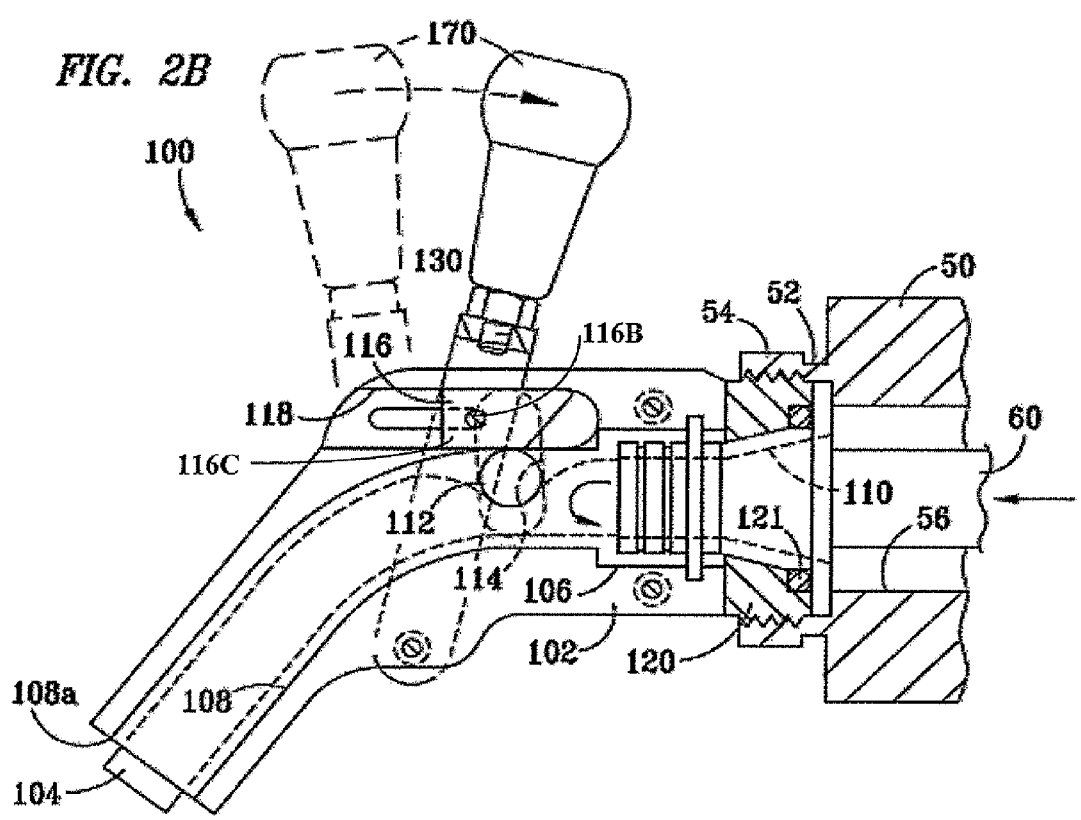
FIG. 2B is a cut-away side view of a first embodiment of a faucet according to the present invention shown in a closed position.

Referring to FIGS. 2A and 2B of the drawings, one embodiment of a faucet assembly 100 of the present invention is shown. The faucet assembly 100 is attached to a column 50 that is mounted in a wall or on top of a counter. The column 50 typically contains a shank 52. The end of the shank 52 that protrudes from the column 50 has a receptacle 54 attached thereto. The inside circumference of the receptacle 54 is threaded. The shank 52 typically contains a flow passageway 56. The flow passageway 56 is connected to one end of the flexible tubing 60. The other end of the flexible tubing 60 is attached to a beverage container (not shown) that can be in the same general location as the column 50, or can be at a location remote from the column 50.

The faucet assembly 100 of one arrangement of the present invention has a shank adaptor 120 that extends beyond the faucet at one end that is threaded on the outside. The shank adapter 120 is threaded into the receptacle 54 at the end of the shank 52. A special sealing washer 121 is typically contained inside the shank adapter 120 so that a leak-proof seal is obtained when the shank adapter 120 is attached to the receptacle 54 and beverage under pressure flows through the system. The faucet assembly 100 comprises a housing 102 that is made of two or more pieces which can be secured together by screws, bolts and nuts, or other appropriate securing means. A short length of flexible tubing 104 is contained in the faucet assembly 100, which is secured at a first end to a second end of the shank adaptor 120, which is opposite the end of the shank adaptor 120 that is threaded on the outside, the second end of the shank adaptor 120 protruding into a channel 108 in the housing 102. In some arrangements of the present invention, a connector 106 secures the first end of the short length of flexible tubing 104 to the second end of the shank adapter 120. The short length of flexible tubing 104 is positioned along its length in the channel 108 in the housing 102. The second end of the short length of flexible tubing 104 is directed to an opening 108a at the second end of channel 108, opposite the end into which the shank adaptor 120 is inserted, and functions as a pour nozzle.

The faucet assembly 100 also contains a pinching apparatus comprising a rolling member or roller 112 and a tapered pressure mechanism or sliding member 116, which is tapered at one end. The tapered pressure mechanism 116 comprises an operator pin 116B and a frame 116C. The roller 112 is positioned in a substantially vertically-oriented groove 114 in the inside of the housing 102, and the tapered pressure mechanism 116 is positioned in another groove 118 in the inside of the housing 102, that is substantially horizontally-oriented and that intersects at least a portion of the top of the vertically-oriented groove 114. The tapered pressure mechanism 116 is oriented in the groove 118 such that the tapered end 116a is closest to the vertically-oriented groove 114, with the uppermost tip of the tapered end 116a closest to the top of the vertically-oriented groove 114. The bottom of the groove 114 intersects a portion of the channel 108 that contains the short length of flexible tubing 104. An arm 130, which is external to the housing 102, or partially external to the housing 102, is secured to at least the non-tapered end of the tapered pressure mechanism 116 by securing means that extend through the width of the groove 118 in housing 102. A handle mechanism 170 is attached to the arm 130

When the handle mechanism 170 is pulled forward, away from the column 50, as shown in FIG. 2A, the arm 130 is pulled away from the column 50 as well. Because the arm 130 is attached to the non-tapered end of the tapered pressure mechanism 116, the tapered pressure mechanism 116 is slid toward the front of the groove 118 in the housing 102. This releases the pressure on the roller 112 from the tapered pressure mechanism 116, which enables the roller 112 of the pinching apparatus to slide into the upper portion of the groove 114 that intersects the groove 118. When the roller 112 is in the upper portion of the groove 114, it is not in that portion of the groove 114 that intersects the channel 108 that contains the short length of flexible tubing 104, thereby releasing pressure placed on the flexible tubing 104 by the presence of the roller 112 in the portion of the groove 114 that intersects the channel 108. The absence of such pressure enables the flexible tubing 104 to expand to fill the groove 108, thereby enabling the flow of beverage from the flow passageway 56 through the opening in the shank adaptor 120 through the short length of flexible tubing 104 contained in the faucet assembly 100, and out the end of the flexible tubing 104 that protrudes into the opening 108a in the faucet housing 102.

When the faucet assembly 100 is in a closed condition as shown in FIG. 2B, the handle mechanism 170 is pushed to the rear, towards the column 50. This pushes the arm 130 attached to the handle mechanism 170 towards the column 50 as well. Because the arm 130 is secured to an end of the tapered pressure mechanism 116 of the pinching apparatus, when the arm 130 moves towards the column 50, the tapered pressure mechanism 116 is also pushed toward the end of the horizontally-oriented groove 118 that is closer to the column 50. This pushes the tapered end 116a of the tapered pressure mechanism 116 against the roller 112. As the tapered pressure mechanism 116 slides further in groove 118 towards the column 50, the tapered tip 116a moves beyond the portion of the groove 118 that intersects the groove 114. As this occurs, increasing pressure is applied to the roller 112 by the increasing diameter of the tapered pressure mechanism 116, causing the roller 112 to slide downward in the groove 114. The roller 112 enters the portion of the groove 114 that intersects with the channel 108, which contains the flexible tubing 104.

The pressure on the roller 112 from the tapered pressure mechanism 116 causes the roller 112 to press down on the upper portion of the short length of flexible tubing 104, compressing the circumference of the flexible tubing 104 against the bottom side of the groove 108, thereby preventing beverage from flowing through the short length of flexible tubing 104. The roller 112 of the pinching apparatus is maintained in the lower portion of the groove 114 by the presence of the tapered pressure mechanism 116 in the portion of the groove 118 that intersects the upper part of the groove 114, preventing the roller 112 from moving back into the upper portion of the groove 114. The tapered pressure mechanism 116 is held in place due to the pressure applied thereto by the arm 130 attached to the tapered pressure mechanism 116.

Referring to FIGS. 3A, 3B, 3C and 3D of the drawings, a preferred embodiment of a faucet assembly 200 of the present invention is shown.

The faucet assembly 200 comprises a housing 202 that is made of two or more pieces which can be secured together with securing means, such as screws, nuts, and bolts, or other appropriate securing means. The housing 202 of this arrangement of the present invention can best be seen in FIG. 3A. The housing 202 has a substantially circular external opening 203 at one end. A substantially rectangular channel 218 in the housing 202 has a "T" shaped opening 219 to the outside cut through the side of the housing 202, with the top of the "T" being oriented vertically and closest to the end of the housing 202 in which external opening 203 is located. A groove 208 extends from channel 218 to an external opening 208a located at the other end of the housing 202.

The faucet assembly 200 also contains a pinching device comprising a pinch roller valve mechanism 212, which is positioned in the channel 218 in the housing 202, the channel 218 being long enough to enable the pinch roller valve mechanism 212 to move forward and back in the channel. As can best be seen in FIG. 3B, the pinch roller valve mechanism 212 comprises a substantially rectangular hollow frame 211. Substantially circular openings, 213a, 213b are centered in two opposing long sides of the frame 211. The other two opposing long sides of the frame 211 contain two slash-shaped openings, 214a, 214b in each side, positioned diagonally to form a "V" shape, with the bottom of the "V" shape having a separator 215 that prevents the two legs of the "V" from joining together. An operator pin 216 is located adjacent to the separator 215 on each side of the pinch roller valve mechanism 212, and projects outwards from the frame 211. A roller 217 is inserted into each opening 214a, 214b, the roller 217 extending through the width of the frame 211 and into the opening 214a, 214b, respectively, on the opposite side of the frame 211.

Figure 3A:
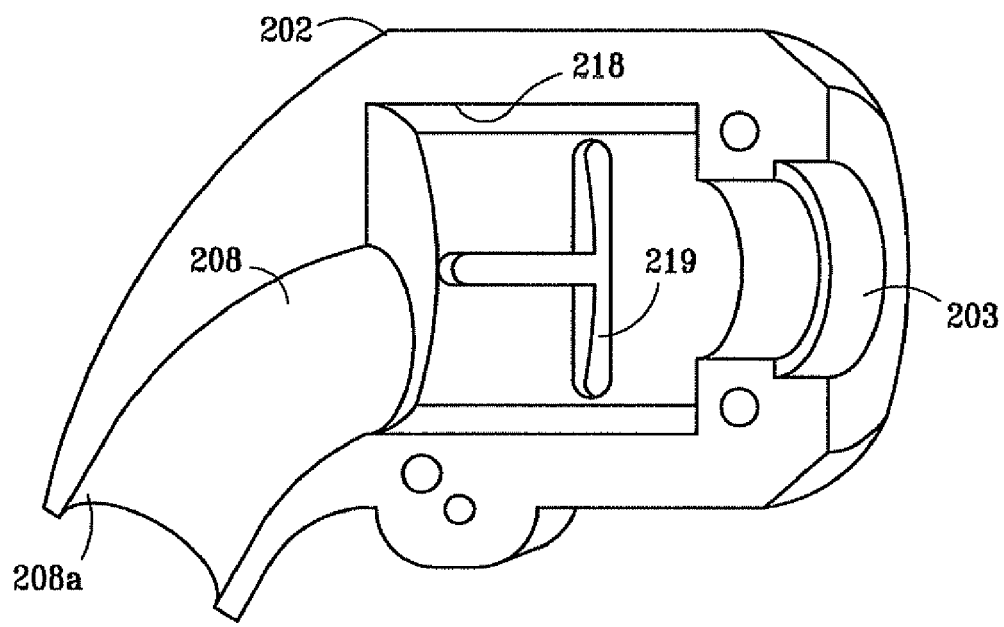
FIG. 3A is an inside view of one part of a faucet housing for a second embodiment of the present invention.
Figure 3B:
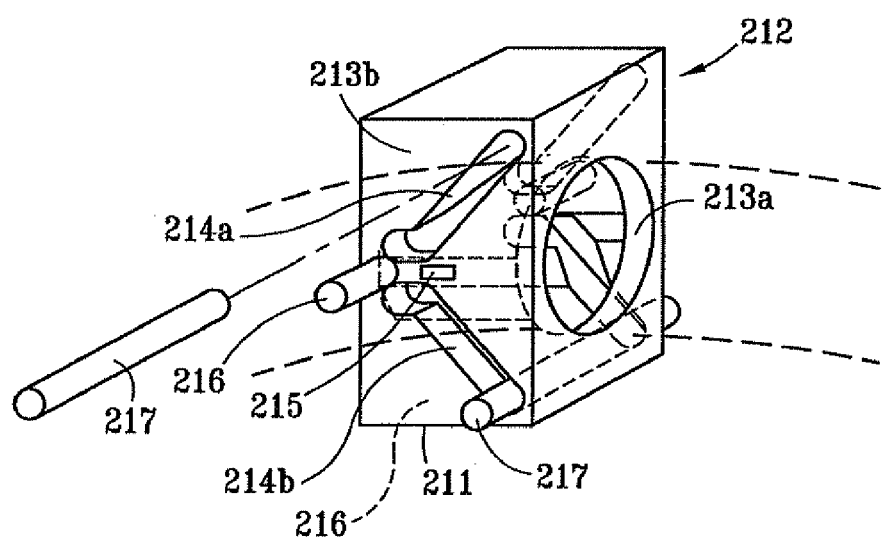
FIG. 3B is a perspective view of a pinch roller valve mechanism used in a second embodiment of the present invention.
Figure 3C:
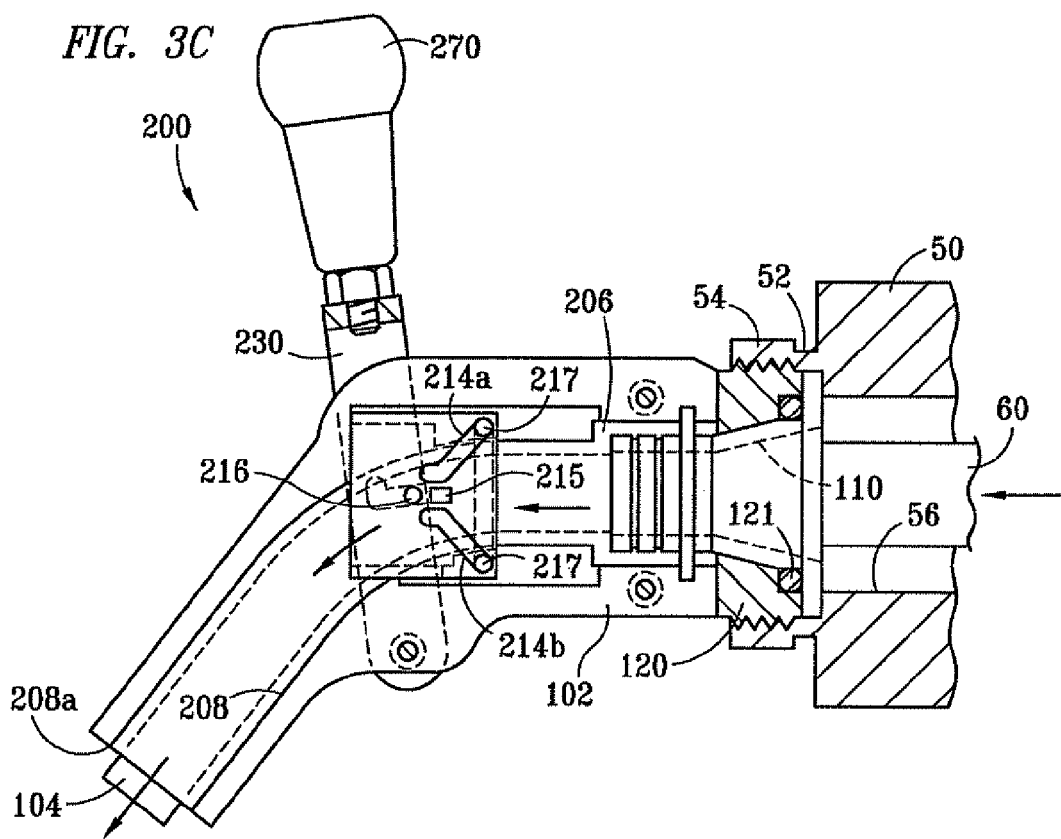
FIG. 3C is a cut-away view of a second embodiment of a faucet according to the present invention shown in an open position.
Figure 3D:
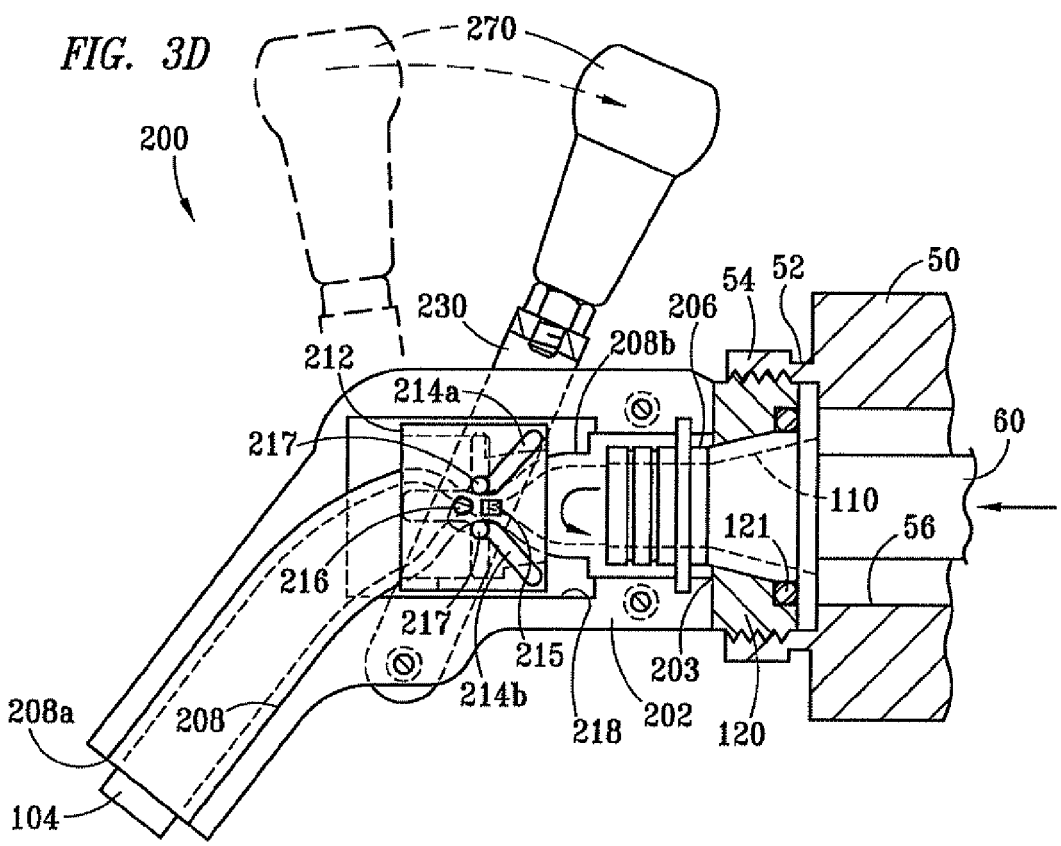
FIG. 3D is a cut-away view side view of a second embodiment of a faucet according to the present invention shown in a closed position.

As shown in FIGS. 3C and 3D, the faucet assembly 200 is attached to a column 50 that is mounted in a wall or on top of a counter. The column 50 typically contains a shank 52. The end of the shank 52 that protrudes from the column 50 has a receptacle 54 attached thereto. The inside circumference of the receptacle 54 is threaded. The shank 52 typically contains a flow passageway 56. The flow passageway 56 is connected to one end of the flexible tubing 60. The other end of the flexible tubing 60 is attached to a beverage container (not shown) that can be in the same general location as the column 50, or can be at a location remote from the column 50.

The faucet assembly 200 of the present invention has a shank adaptor 120 that is inserted into the opening 203 in one end of the housing 202, and extends beyond the faucet assembly 200. The shank adapter 120 is threaded on the outside of the end farthest from the faucet assembly 200, and screws into the receptacle 54 at the end of the shank 52. A special sealing washer 121 is typically contained inside the shank adapter 120 so that a leak-proof seal is obtained when the shank adapter 120 is attached to the receptacle 54, and beverage under pressure flows through the system.

A short length of flexible tubing 104 is contained in the faucet assembly 200, which is secured at a first end to the end of the shank adaptor 120, which protrudes into opening 203 in the housing 202. In some arrangements of the present invention, a connector 206 secures the first end of the short length of flexible tubing 104 to the second end of the shank adapter 120. The short length of flexible tubing 104 is threaded through the circular openings 213a, 213b in the frame 211 of the pinch roller valve mechanism 212. The remainder of the short length of flexible tubing 104 is positioned in the channel 208 in the housing 202, and the second end of the short length of flexible tubing 104 is directed to external opening 208a at the end of the housing 202 opposite the opening 203 into which the shank adaptor 120 is inserted, and functions as a pour nozzle.

The operator pins 216 on the pinch roller valve mechanism 212 are long enough to extend through the "T" shaped openings or guide slots 219 and beyond the housing 202 on each side. An arm mechanism 230, which is external to the housing 202, also has openings in each side. The arm mechanism 230 is positioned around and secured to the housing 202 such that the operator pins 216 fit into the openings in the arm mechanism 230. A handle mechanism 270 is attached to the arm 230 which controls the pinching apparatus.

When the handle mechanism 270 is pulled forward, away from the column 50, as shown in FIG. 3C, the arm 230 is pulled away from the column 50 as well. Because the arm 230 is positioned around the operator pins or follower rods 216, the operator pins 216 are pulled toward the bottoms of the horizontal legs of the "T" openings or guide slots 219 in the housing 202. Because the operator pins 216 are attached to the pinch roller valve mechanism 212, the pinch roller valve mechanism 212 slides forward in the channel 218, away from the column 50 as well. This allows the pinch rollers 217a, 217b to move toward the top outside positions in the slash-shaped openings or cam slots 214a and 214b, away from the separator 215, and toward the outside ends of the "V" shape, which outside ends are approximately aligned with the outer points of the vertically oriented leg of the "T" openings or guide slots 219 in the housing 202. This positions the pinch rollers 217a, 217b beyond the outside diameter of the flexible tubing 104, thereby enabling the flow of beverage from the flow passageway 56 through the opening in the shank adaptor 120, through the short length of flexible tubing 104 contained in the faucet assembly 200 and out through the end of the flexible tubing 104 that protrudes into the opening 208a in the faucet housing 202.

When the faucet assembly 200 is in a closed condition, as shown in FIG. 3D, the handle mechanism 270 is pushed to the rear, towards the column 50. This pushes the arm 230 towards the column 50 as well, closing the pinching apparatus. Because the arm 230 is mounted around the operator pins 216, the operator pins 216 are slid toward the inner points of the horizontally-oriented leg of the "T" openings or guide slots 219 in the housing 202. Because the operator pins 216 are attached to the pinch roller valve mechanism 212, the pinch roller valve mechanism 212 slides rearward in the channel 218, toward the column 50 as well. This pulls the pinch rollers 217a, 217b toward the bottom of the slashed-shaped openings or cam slots 214a and 214b, toward the separator 215 and toward the base of the "V" and consequently toward the inside of the vertically-oriented leg of the "T" openings or guide slots 219 in the housing 202. This compresses the flexible tubing 104 between the rollers 217a and 217b, thereby preventing beverage from flowing from the flow passageway 56 through the opening 210 in the shank adaptor 120 or out through the end of the flexible tubing 104 that protrudes into the opening 208a in the faucet housing. The rollers 217a and 217b are maintained pinched together around the flexible tubing 104 by means of pressure exerted by the arm mechanism 230 holding the operator pins 216 in position, which prevents the pinch roller valve mechanism 212 from moving back into the front portion of the channel 218.

To reduce costs of the faucet assembly 100, 200, it has been found that the housing 202 can be made of plastic or petroleum-based products. Because housing 202 is not a moving part, it is not as subject to wear, and therefore making the housing 202 of a non-metallic material will not increase the frequency of replacement of the faucet assembly. Additionally, because the housing 202 does not come in contact with the beverage being poured, the material composition will not impart any "off" flavor to the beverage. Additionally, if the housing 202 is made of a non-metallic material, it may be easier to configure the housing 202 to contain the interior grooves as it may be easier to make such grooves in non-metallic materials or mold or cast non-metallic materials. Similarly, in another embodiment of the present invention, certain parts of the faucet assembly 100, 200, such as the shank adapter 120, connector 106, pinch rollers 217a, 217b, operator pins 216 and/or arm 130, 230 can be made of stainless steel, rather than brass or some other substance that does not have the increased wear characteristics of stainless steel. Although stainless steel is typically more expensive than other materials such as brass, the longer life of the parts may justify the increased cost.

An unexpected side benefit of the present invention has been a reduction in the amount of foam seen in beers dispensed through the faucet 100, 200 of the present invention. In prior art faucets 10, when beer flowing through the tubing 60 reached the faucet, the opening 18 in the faucet 10 was typically of a larger diameter than that of the tubing 60 so that beer could be dispensed rapidly, and there was room for the valve mechanism inside the faucet. When the beer flowing through the tubing 60 reached the area 18 in the faucet 10 where there was suddenly an increase in available volume, the pressure on the beer from the carbon dioxide was reduced, and the carbon dioxide would dissolve out of the solution of the beer and cause foaming of the beverage being dispensed. A high volume of foam in the dispensed beverage is undesirable and results in wasting of the beverage being dispensed. In the faucet 100, 200 of the present invention, the flexible tubing 104 in the faucet 100, 200 is of approximately the same size as the tubing 60 to the faucet 100, 200. Thus, when beer flows through the faucet 100, 200, there is no increase in volume or consequent reduction in pressure, and as a result, no excessive foaming of the beverage being dispensed.

It is understood that the present invention can take many forms and embodiments. Accordingly, several variations may be made in the foregoing without departing from the spirit or the scope of the invention. For example, paddles, rather than rollers, can be used for compression of the flexible tubing.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A faucet, comprising:
   a housing having a first generally linear groove and a second generally linear groove therein, wherein the first groove and the second groove are at an angle relative to one another;
   a sliding member secured in the first groove and adapted to move between an open position and a closed position;
   a rolling member secured in the second groove and adapted to engage the sliding member, wherein the rolling member is displaced by the sliding member in the closed position;
   a length of flexible tubing secured in the housing that is pinched by the rolling member in the closed position; and
   an arm secured to the housing and secured to the sliding member by a pin, the arm being adapted to move the sliding member between the open and closed positions.

2. The faucet of claim 1, wherein the sliding member has a tapered end.

3. The faucet of claim 1, wherein the housing further comprises a shank adapter.

4. The faucet of claim 1, wherein the shank adapter is made of stainless steel.

5. A beverage dispensing system, comprising:
   a pressurized vessel containing a beverage;
   a feed line secured to the vessel for carrying the beverage; and
   a faucet secured to the feed line for dispensing the beverage, the faucet including:
      a housing having a first generally linear groove and a second generally linear groove therein, wherein the first groove and the second groove are at an angle relative to one another;
      a sliding member secured in the first groove and adapted to move between an open position and a closed position;
      a rolling member secured in the second groove and adapted to engage the sliding member, wherein the rolling member is displaced by the sliding member in the closed position;
      a length of flexible tubing secured in the housing that is pinched by the rolling member in the closed position; and
      an arm secured to the housing and secured to the sliding member by a pin, the arm being adapted to move the sliding member between the open and closed positions.

6. The system of claim 5, wherein the sliding member has a tapered end.

7. The faucet of claim 5, wherein the housing further comprises a shank adapter for securing the feed line to the faucet.

8. The faucet of claim 5, wherein the shank adapter is made of stainless steel.

* * * * *